Patented Nov. 19, 1935

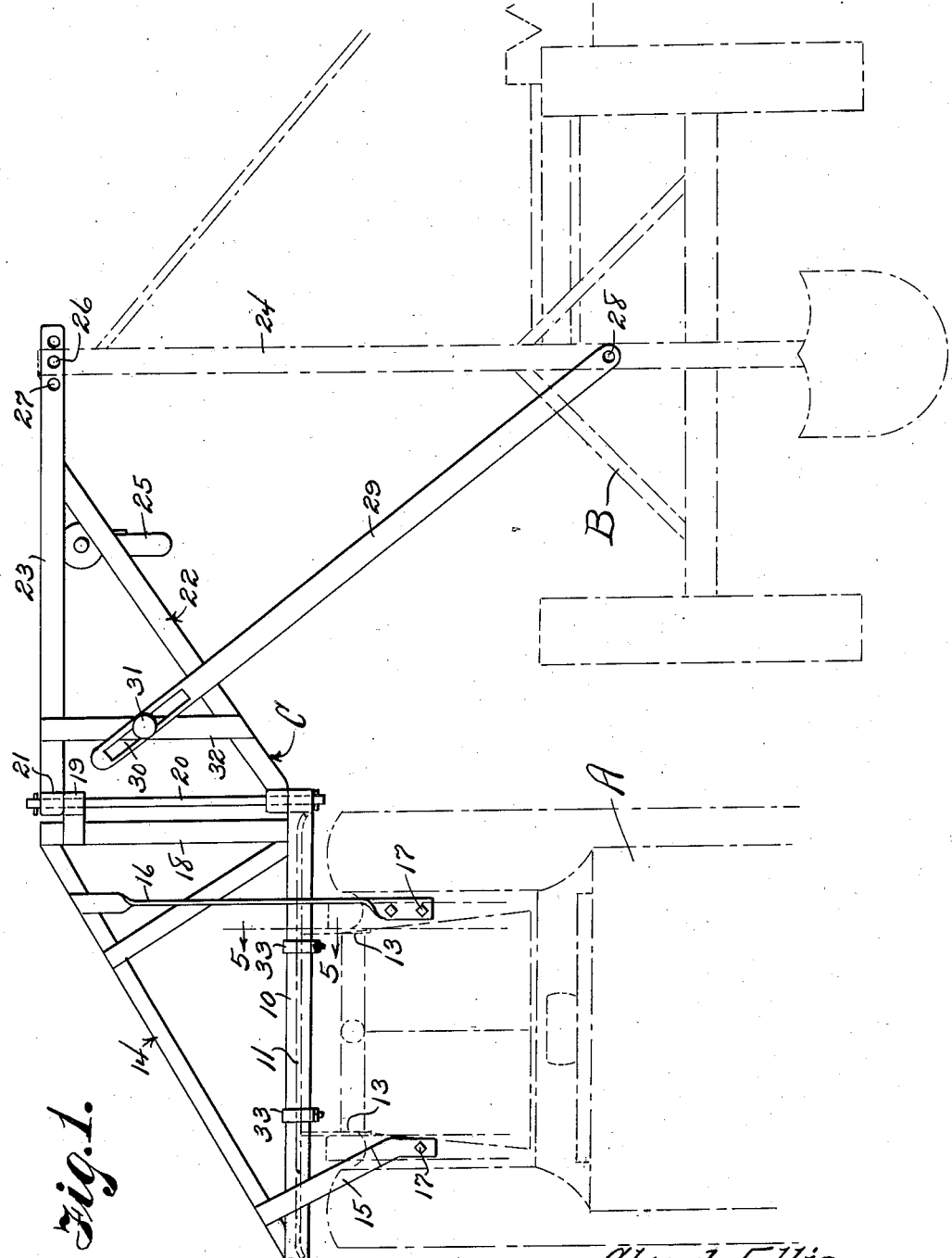

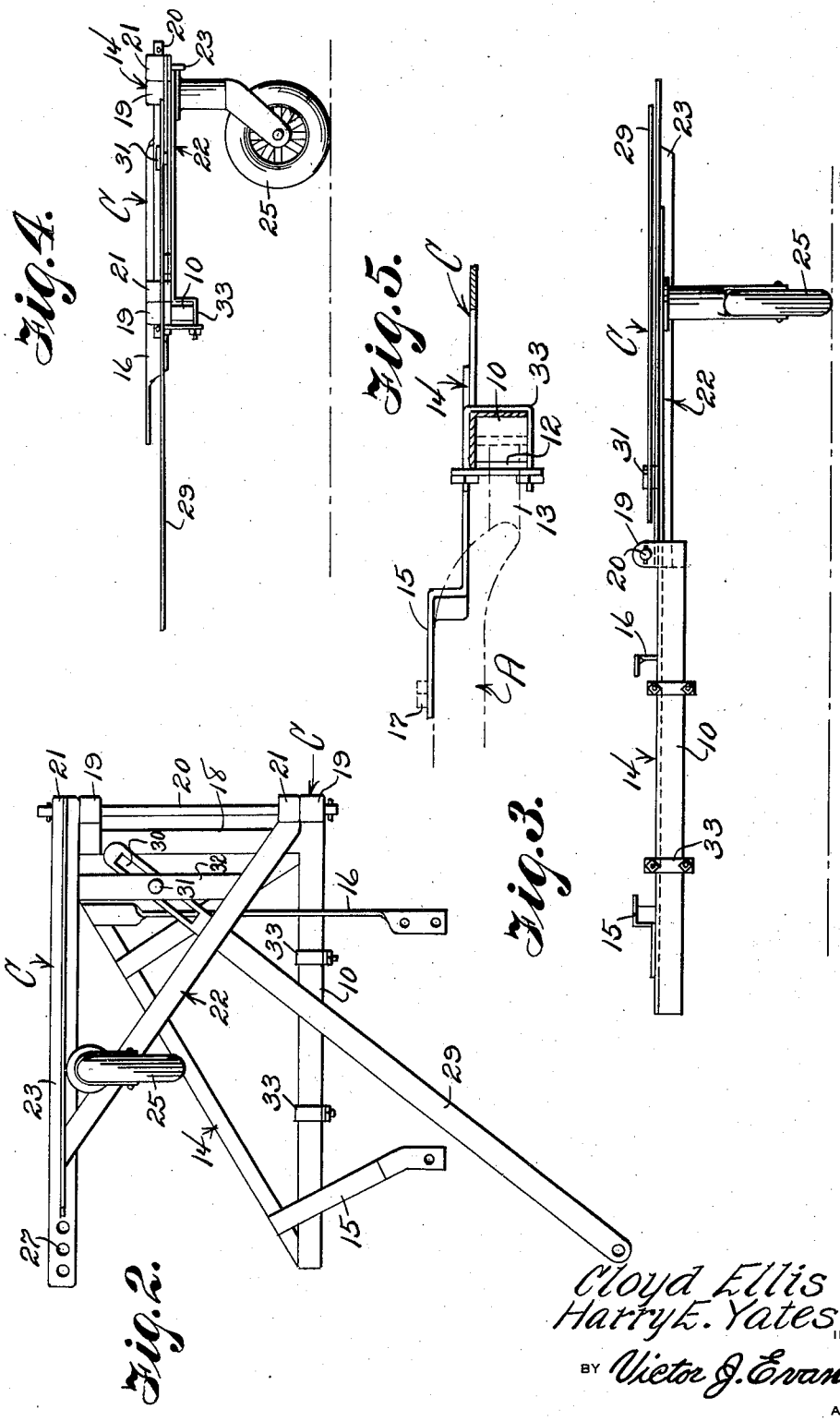

2,021,840

UNITED STATES PATENT OFFICE 2,021,840

MOTOR TRUCK OR TRACTOR HITCH

Cloyd Ellis and Harry E. Yates, Chrisman, Ill.

Application November 26, 1934, Serial No. 754,901

1 Claim. (Cl. 280—33.13)

The invention relates to a vehicle hitch and more especially to a foldable hitch for motor trucks or tractors.

The primary object of the invention is the provision of a hitch of this character, wherein the same is adapted for attachment to the front bumper and frame or chassis of a motor vehicle, such as a truck or tractor, and is susceptible of folding and is freely flexible, so that machinery can be pulled and at the same time a clear or full view can be had of the load and also in advance of the motor vehicle and such load will be freely guided without possibility of contact with the vehicle.

Another object of the invention is the provision of a hitch of this character, wherein the hauled machinery will follow the contour of the ground, in that the hitch is freely flexible for this purpose and when such hitch is not in use it can be folded for support by the bumper and frame of the motor vehicle to which it is attached.

A further object of the invention is the provision of a hitch of this character, which is extremely simple in its construction, readily and easily applied to and removed from a motor vehicle, such as a truck or tractor, thoroughly reliable and efficient in its operation, readily and easily folded for transportation purposes when not in use, strong, durable, and inexpensive to manufacture and install.

With these and other objects in view, the invention consists in the features of construction, combination and arrangement of parts as will be hereinafter more fully described in detail illustrated in the accompanying drawings, which disclose the preferred embodiment of the invention, and pointed out in the claim hereunto appended.

In the accompanying drawings:

Figure 1 is a diagrammatic plan view of a portion of a motor vehicle and a mowing machine showing the hitch attached to the vehicle and to the mowing machine and constructed in accordance with the invention.

Figure 2 is a top plan view of the hitch folded when not in use.

Figure 3 is a front elevation of the hitch.

Figure 4 is a side elevation thereof.

Figure 5 is a fragmentary enlarged detail sectional view on the line 5—5 of Figure 1 looking in the direction of the arrows.

Similar reference characters indicate corresponding parts throughout the several views in the drawings.

Referring to the drawings in detail, A designates generally a portion of a motor vehicle, such as a truck, and B a portion of a mowing machine, respectively, these being of conventional types, while C designates generally the foldable and flexible hitch for the same, it being understood, of course, that this hitch is adaptable for attachment to other motor vehicles, as for example, tractors (not shown) and also for the hauling of machinery other than a mowing machine, the latter being merely illustrative of one application of the hitch thereto.

This hitch C comprises a straight inverted substantially U-shaped beam 10, it being adapted for fitting over the bumper bar 11 of a bumper as carried by the vehicle A, the beam at the required points being cut away, at 12, to form a clearance for the brackets 13 of such bumper.

Joined with the beam 10 or integral therewith and projecting forwardly from the front of the same is a triangular-shaped extension or frame 14 which is sustained in a substantially horizontal plane through the instrumentality of braces 15 and 16, respectively, these being made secure, as at 17, to the chassis or frame of the vehicle. The frame 14 is of a width substantially that of the width of the vehicle and at the wider side 18 of such frame are pintle eyes 19 receiving a hinge pintle or pivot shaft 20 which is also passed through pintle eyes 21 of a substantially triangular-shaped foldable extension or frame 22 including a coupling bar 23 which, on the unfolding of the hitch, extends laterally to one side of the vehicle A, as is clearly apparent in Figure 1 of the drawings. Adjustably connected with the coupling bar 23 is the draft pole 24 of the mowing machine B.

The frame 22, intermediate of its ends, has fitted therewith a swiveled caster wheel or roller 25 which contacts with the ground in advance of the mowing machine B during the draft thereof on the unfolding of the frame 22 with relation to the frame 14 and thus this frame 22 is supported by such wheel or roller 25 during the travel of the motor vehicle and the machinery drawn thereby. The connection of the pole 24 with the coupling bar 23 of the frame 22 is in the nature of a pivot, as at 26, selectively engageable with spaced holes or openings 27 in said bar 23.

With the pole 24 is pivoted, at 28, a link 29 which has the elongated slot 30 in the end portion thereof remote from the pivot 29 and this slot receives a coupling pin 31 which is made fast in a cross reinforcing piece 32 as carried by the frame 22. Thus it will be seen that the mowing machine B is susceptible of free flexibility so as to follow the ground contour and such link 29 avoids any possibility of conflict of the machine B with the vehicle A during the draft of said machine. The pivot 28 is removable from the pole 24 and likewise the coupling pin 26 is detachable from the bar 23 so as to detach the machine B from the vehicle A, and when the hitch is not in use the frame 22 can be folded onto or over the frame 14 and thus such hitch in its folded condition transported by the vehicle A.

The beam 10 is made secure upon the bumper bar 11 of the bumper of the vehicle A through the instrumentality of clips 33, these embracing the said beam 10 and also the bar 11, as will be obvious from Figures 4 and 5 of the drawings.

It will be apparent that the machine exampled by the mowing machine B will be hauled at one side of the motor vehicle A and by the latter, so that full view ahead of the operator of the vehicle is assured and at the same time view may be had of the working of the machine B and thus the operator of the vehicle A at all times can see what is taking place with the machine B.

What is claimed is:

A hitch of the character described, comprising a beam for fitting a bumper bar of a vehicle, clips adjustably securing the beam upon said bar, a triangular shaped frame carried by and projecting forwardly from the beam, bars formed on said beam and frame for location at one side of the vehicle, a triangular shaped raising and lowering frame pivoted to said bars for vertical swing and providing a coupling rail at the forward portion of the second-named frame for adjustable connection of a draft pole of an agricultural machine therewith, a caster wheel swiveled to the last-named frame, and a link pivoted to the pole and having pivotal and slidable connection with said last-named frame.

CLOYD ELLIS.
HARRY E. YATES.